J. S. ISLAND.
PROCESS FOR EXTRACTING OR SEPARATING PRECIOUS VALUES FROM ORES.
APPLICATION FILED FEB. 23, 1910.
965,714.
Patented July 26, 1910.
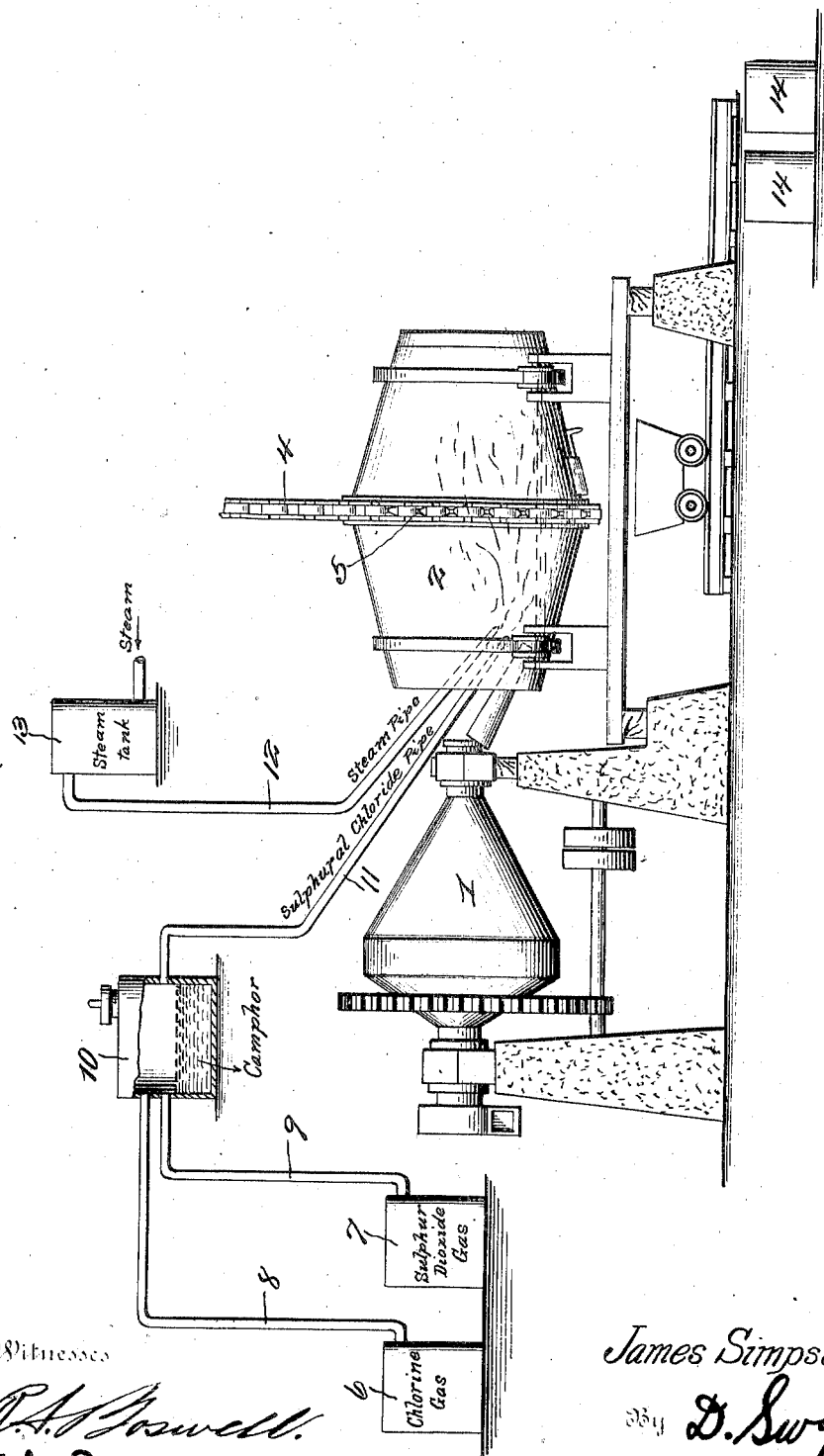
Witnesses
Inventor
James Simpson Island
By D. Swift
Attorney

UNITED STATES PATENT OFFICE.

JAMES S. ISLAND, OF TORONTO, ONTARIO, CANADA.

PROCESS FOR EXTRACTING OR SEPARATING PRECIOUS VALUES FROM ORES.

965,714.

Specification of Letters Patent. Patented July 26, 1910.

Application filed February 23, 1910. Serial No. 545,526.

*To all whom it may concern:*

Be it known that I, JAMES SIMPSON ISLAND, a subject of the King of Great Britain, residing at Toronto, in the Province of Ontario, Dominion of Canada, have invented a new and useful Process for Extracting or Separating Precious Values from Ores; and I do hereby declare the following to be a full, clear, and exact description of the invention, such as will enable others skilled in the art to which it appertains to make and use the same.

This invention relates to a new and useful process, or method for extracting or separating the precious values from ores, by reducing the mineral ores to a soluble state or salts, by subjecting the ore to a mixture of sulfuric and hydrochloric acids.

The ore, if coarse, is crushed by a suitable crusher (not shown) and then pulverized by a pulverizer. The ore is pulverized to a grade, that will pass through a hundred mesh screen, then deposited into a converter or separator, where it is subjected to the sulfuric and hydrochloric acids. These sulfuric and hydrochloric acids are produced by passing a mixture of chlorin and sulfur dioxid gases, over an area of camphor, then together with the steam, is projected into the converter or separator, thereby producing sulfuric and hydrochloric acids, which is shown by the following equation:

$$SO_2 \text{ and } 2Cl \text{ and } 2H_2O = H_2SC_4 \text{ and } 2HCl$$

(which is the equivalent of sulfur dioxid and chlorin and water=sulfuric acid and hydrochloric acid). When the sulfuric and hydrochloric acids come in contact with the ore in the converter or receptacle, it reduces the ore and the metal therein, into a soluble salt.

In the drawings accompanying this application, a conventional form of apparatus is illustrated, in order to carry out the process.

Relative to the drawings, 1 denotes a pulverizer from which the ore is delivered into the separator or converter 2, which is of the usual character, and revolves in the usual manner by the sprocket and chain 4 and 5.

6 represents a chlorin gas generator, while 7 denotes a sulfur dioxid gas generator. Leading from these two generators are pipes or conduits 8 and 9, which communicate with a coupler 10. As these two gases reach the coupler, they unite and form sulfuryl chlorid. This sulfuryl chlorid is conveyed through the pipe or conduit 11 into the separator or converter, where it combines with steam (which is conveyed to the converter or separator through the pipe or conduit 12 from the steam generator 13), thereby producing hydrochloric and sulfuric acids, which act upon the ore in the separator or converter, in order to reduce or convert the ore and the metal, therein into a soluble salt. The ore is treated by these hydrochloric and sulfuric acids, for a period of four or five hours, in which time the metal values contained therein have been reduced or converted into soluble salts. This soluble salts may be then extracted from the converter or separator by any suitable means (not shown) and then conveyed to and delivered into leaching tanks or receptacles 14. When the soluble salts has been deposited in the tanks, the metal values may be readily separated from the refuse. When the chlorin and sulfur dioxid gases are united in the coupler 10, they are passed over an area of camphor, which produced the sulfuryl chlorid. Before the sulfuryl chlorid combined with steam, is introduced or projected into the converter; the ore therein may be first heated for a period of time, suitable to the operators of this process.

The invention, having been set forth, what is claimed, as new and useful, is:—

1. A process for separating the metal values from ores, by reducing or converting the metal values into soluble salts, by subjecting the ores to a chemical fluid, composed of chlorin, sulfur dioxid and camphor, then combining this fluid with steam, thereby producing sulfuric and hydrochloric acids.

2. A process for separating metal values from ores, which consists in reducing or converting the metal values into soluble salts, by subjecting the ores to sulfuryl chlorid, combined with steam, which produces sulfuric and hydrochloric acids.

3. A process for separating metal values from ores, which consists in first pulverizing the ores, and then reducing or converting the metal values into soluble salts, by subjecting the ores to a treatment of sulfuryl chlorid and steam for a period of four hours.

4. A process for separating metal values from ores, which consists in first heating the ores for a period of time, and then subjecting the ores to sulfuric and hydrochloric acids, thereby reducing or converting the metal into soluble salts, then separating the metal values from the refuse, said sulfuric and hydrochloric acids being produced by passing a mixture of chlorin and sulfur dioxid gases, over an area of camphor, and then combining the mixture with steam.

In testimony whereof I have signed my name to this specification in the presence of two subscribing witnesses.

JAMES S. ISLAND.

Witnesses:
 DEAN SWIFT,
 ROBERT A. BOSWELL.